(12) United States Patent
Hilst

(10) Patent No.: US 7,988,788 B2
(45) Date of Patent: Aug. 2, 2011

(54) PROCESS FOR RAPID ACID HYDROLYSIS OF LIGNOCELLULOSIC MATERIAL AND IN A HYDROLYSIS REACTOR

(75) Inventor: Antonio Geraldo Proenca Hilst, Piracicaba (BR)

(73) Assignee: Dedini S.A. Industrias De Base, Piracicaba (BR)

( * ) Notice: Subject to any disclaimer, the term of this patent is extended or adjusted under 35 U.S.C. 154(b) by 725 days.

(21) Appl. No.: 11/916,617

(22) PCT Filed: Oct. 31, 2006

(86) PCT No.: PCT/BR2006/000239
§ 371 (c)(1),
(2), (4) Date: Mar. 11, 2008

(87) PCT Pub. No.: WO2007/051269
PCT Pub. Date: May 10, 2007

(65) Prior Publication Data
US 2008/0202504 A1 Aug. 28, 2008

(30) Foreign Application Priority Data
Nov. 1, 2005 (BR) ....................... 0505212

(51) Int. Cl.
*C13K 1/02* (2006.01)
*D21C 3/20* (2006.01)
*D21C 7/00* (2006.01)
(52) U.S. Cl. ................. 127/37; 127/1; 162/19; 162/77; 162/237; 162/249

(58) Field of Classification Search .................... 127/37, 127/1; 162/19, 77, 237, 249
See application file for complete search history.

(56) References Cited

U.S. PATENT DOCUMENTS
4,941,944 A 7/1990 Chang et al.
5,879,463 A * 3/1999 Proenca .......................... 127/37

FOREIGN PATENT DOCUMENTS
WO 82/03409 10/1982
WO 97/33035 9/1997

OTHER PUBLICATIONS
Written Opinion for PCT/BR2006/000239, undated.*

* cited by examiner

*Primary Examiner* — David A Reifsnyder
(74) *Attorney, Agent, or Firm* — Fish & Richardson P.C.

(57) ABSTRACT

Improvements in a process for rapid acid hydrolysis of lignocellulosic material and in a hydrolysis reactor, said lignocellulosic material being fed in different levels of a reactor and contacted with flows of lignin organic solvent, water and an extremely dilute solution of a strong inorganic acid, for obtaining a liquid phase of hydrolysis extract and a solid phase of non-reacted and non-dissolved material. A controlled steam flow is injected into the different levels of the reactor, so as to provide adequate temperatures of organic solvent and strong inorganic acid and forming the desired products (sugars). A flow of the liquid phase is recirculated in different levels of the reactor, the remainder thereof being withdrawn from the reactor, abruptly cooled with the solvent submitted to evaporation to obtain a concentrate. The lignin is transferred by decantation and the concentrate is transferred to subsequent process steps.

13 Claims, 3 Drawing Sheets

PROCESS FOR RAPID ACID HYDROLYSIS OF LIGNOCELLULOSIC MATERIAL AND IN A HYDROLYSIS REACTOR

CROSS REFERENCE TO PRIOR APPLICATIONS

This application is the U.S. national phase of International Application No. PCT/BR2006/000239, filed Oct. 31, 2006, which claims priority from Brazilian Patent Application No. PI0505212-2, filed Nov. 1, 2005, the disclosure of both are incorporated herein by reference in their entirety. The International Application was published in English on May 10, 2007 as WO 2007/051269 under PCT Article 21(2).

FIELD OF THE INVENTION

The present invention relates to improvements introduced in a process for acid hydrolysis of lignocellulosic material, such as wood, sugar cane bagasse, vegetable straw, etc., for the obtention of sugars and lignin, as well as in the reactor for carrying out the referenced process. In a particular way, the invention relates to improvements introduced in the hydrolysis process and in the reactor defined in Brazilian patent PI9600672-2.

PRIOR ART

For the effect of hydrolysis, the lignocellulosic materials may be described as a cellulosic, hemicellulose and lignin complex, further containing lower organic components, such as taninnes, waxes, oils, etc, said "extractive" and mineral substances (silica, calcium, potassium, sodium, etc, the ashes). The cellulose (or glicane, 36% to 40% in mass) is a glucose polymer found in two forms—amorphous (its greater part) and microcrystalline. The hemicellulose (34%) is a complex amorphous polymer containing glicane (8%), xylane (22%), arabinane and galactane (total 4%). It has been shown that the hemicellulose hydrolyzes almost instantly, the microcrystalline cellulose is quite resistant to acid attacks and the amorphous cellulose is intermediary. The lignin (a polymer derived from phenyl propene containing active phenolic functions) is not soluble in an exclusive acid medium, but may be dissolved by certain organic solvents. The ashes are constituted of silica and aluminum and iron oxides that are very little soluble in hydrolytic means, and of potassium, sodium oxides, etc., that are soluble in acids. Such characteristics require desirable conditions for the hydrolysis apparatus and processes.

The processes for acid hydrolysis of lignocellulosic materials produce, among others: hexoses (sugars with 6 carbons), such as glucose, galactose and mannose; pentoses (sugars with 5 carbons), such as xylose and arabinose: lignin; furfural; 5-hydroximethil furfural; acetic acid; and methanol among others, in variable proportions, depending on the raw material being processed.

Aiming at obtaining a continuous and rapid acid hydrolysis of lignocellulosic materials, using dilute acids, with reduced investment in equipment, as well as with commercially acceptable yield due to high levels of sugar concentration and lignin recovery, without requiring a delignification step, patent PI9600672-2, from the same inventor, has proposed a process according to which a continuous flow of pre-heated and comminuted lignocellulosic material is fed by the top of a pressurized reactor, to be contacted, in different levels of the reactor, with a plurality of flows of a hydrossolvent comprising a greater portion of a lignin organic solvent, water and a smaller portion of an extremely dilute solution of a strong inorganic acid, producing a liquid phase, in the form of a hydrolysis extract comprising reaction products of the cellulose and a lignin solution, and a solid phase comprising non-reacted and non-dissolved material, to be deposited at the bottom of the reactor.

In this prior art process, a controlled flow of the hydrolysis extract, obtained in different levels of the reactor, is recirculated and incorporated, at a duly adjusted temperature, to a correspondent flow of hydrossolvent, so as to provide in said levels of the reactor, temperatures and concentrations of organic solvent and of strong inorganic acid which are adequate to react the cellulosic material and to dissolve the lignin present in the respective levels of the reactor.

According to the above mentioned process of the same inventor, the remainder of the liquid phase (hydrolysis extract) is withdrawn from the different levels of the reactor and submitted to an abrupt lowering of temperature, avoiding the decomposition reactions of the reaction products of the cellulosic portion and obtaining, through evaporation of the solvent, a concentrate of the reaction products of the cellulosic portion and of the lignin.

The above mentioned process achieved the object of obtaining a simultaneous delignification and saccharification, according to temperature and concentration parameters of both the organic solvent and the reagent (strong inorganic acid) that are controlled in the different levels of the reactor, obtaining lignin dissolution and a maximum conversion of sugars not submitted to thermal decomposition.

While leading to results much superior to those of the processes known so far, allowing much higher yield levels to be reached by, using less equipment of lower cost, the process object of patent PI 9600672-2 has the temperature control of both the organic solvent and the strong inorganic acid, i.e., of the hydrossolvent system, carried out by heating the controlled flow of the hydrolysis extract that is recirculated to the different levels of the reactor, requiring heat exchangers with accessories and therefore more investment, with more possibilities of failures and mechanical wear by erosion or corrosion.

Besides the system for controlling the temperature of the hydrossolvent system, the above-mentioned process provides a hydrolysis extract captation for recirculation and for the subsequent steps of recovering sugars and lignin, by means of respective tubes derived from the discharge of a respective circulating pump for each region of the reactor, the control of the respective flows being carried out by an adequate flow control means, such as a control valve. In this prior solution, both the hydrolysis extract to be recirculated and that to be conducted to the subsequent process steps, are captured from the same captations provided in the reactor, so as not to receive particulate material, but only the filtered hydrolysis extract.

In the prior construction, the hydrolysis extract flow to be recirculated has its flow rate limited to the availability of filtered hydrolysis extract to be partially sent to subsequent process steps and partially recirculated to the interior of the reactor.

SUMMARY OF THE INVENTION

On account of the deficiencies regarding the control of the temperature and concentration parameters of both the solvent and the reagent in the hydrossolvent flows in the different levels of the reactor, it is an object of the present invention to provide improvements in the process for rapid acid hydrolysis of lignocellulosic material, object of patent PI 9600672-2, in order to obtain a substantially more precise control of said parameters and, consequently, optimize the recovery process yield of the sugars and lignin.

It is a further object of the present invention to provide an improvement in said process for rapid acid hydrolysis which does not impose relevant limitations to the hydrolysis extract flow to be recirculated.

It is also another object of the present invention to provide a reactor that allows carrying out said process for acid hydrolysis with a substantially more precise control of the temperature and concentration parameters of the solvent and reagent in the hydrossolvent flows.

The above and other objects and advantages of the present invention are achieved by the provision of a process for rapid acid hydrolysis of lignocellulosic material containing a cellulosic portion and a lignin portion, comprising the steps of:

(a) continuously feeding a pressurized reactor by the top, with a uniform flow of lignocellulosic material comminuted to a hydrolizably acceptable particle size;

(b) contacting said lignocellulosic material in the different levels of the reactor with a plurality of flows of a hydrossolvent system, comprising a greater portion of a lignin organic solvent and water, and a smaller portion of an extremely dilute solution of a strong inorganic acid, so as to simultaneously dissolve the lignin and make the cellulosic material react, producing a hydrolysis extract comprising reaction products of the cellulosic portion and a lignin solution, and a solid phase comprising non-reacted and non-dissolved material; and (c) retaining said solid phase, in such a way as to provide its deposition at the bottom of the reactor.

According to the present invention, the improved process for rapid acid hydrolysis of lignocellulosic material further comprises the steps of:

(d) injecting a controlled flow of steam in the different levels of the reactor, adjusting the temperature to the desired value, and incorporating the condensate resulting from the steam to the hidrossolvent flow, so as to provide, in said levels of the reactor, temperatures of organic solvent and of strong inorganic acid that are adequate to dissolve the lignin and to cause the cellulosic material present in the respective levels of the reactor to react with the water (hydrolysis) forming the desired products (sugars);

(e) recirculating a controlled flow of the liquid phase obtained in step (b), in the different levels of the reactor, and incorporating it to a corresponding hydrossolvent flow, so as to provide, in said levels of the reactor, concentrations of organic solvent and strong inorganic acid that are adequate to react the cellulosic material and to dissolve the lignin present in the respective levels of the reactor;

(f) withdrawing directly from said levels of the reactor the remainder of said liquid phase, submitting it, at the exit of said reactor, to an abrupt lowering of temperature, so as to avoid decomposition reactions of said reaction products of the cellulosic portion and obtaining, through evaporation of the solvent, a concentrate of the reaction products of the cellulosic portion and of the lignin;

(g) separating said lignin by decantation; and (h) transferring the concentrate of the reaction products of the cellulosic portion to the subsequent process steps.

In a second aspect, the present invention relates to a hydrolysis reactor for the execution of the process for rapid acid hydrolysis of lignocellulosic material as described above, said hydrolysis reactor comprising a vertical tubular body provided with a plurality of hydrolysis extract captations in different levels; a lignocellulosic material top feeding opening; a plurality of hydrossolvent feeding tubes, each feeding a determined level of the reactor; a plurality of hydrolysis extract recirculation circuits, each connecting at least one hydrolysis extract captation to a respective hydrossolvent feeding tube; and a hydrolysis extract outlet tube, connected to at least one hydrolysis extract captation, to conduct a controlled portion of the latter to a subsequent process step.

According to this second aspect of the invention, the reactor is provided with a plurality of heating steam inlets, in a defined flow, each inlet being positioned in one of the cited levels of the reactor, allowing an extremely precise adjustment of the temperature of the reagents available in the different levels of the reactor.

In practical terms, the process for acid hydrolysis of lignocellulosic material presents in relation to the advantages already commented regarding the above process, the fact that:

the temperature control is effected by a plurality of heating steam inlets in the different levels of the reactor, allowing the heating reactional medium, with the mixture, to occur instantaneously and the effect upon the reactions to be confined to the core of the reactor, at the outlet level, reducing the permanence (residence time) of the products of the reactions at the high temperatures reigning therein and reducing its degradation by undesirable secondary reactions; the direct steam injection results in a higher reaction velocity, and in a yield of sugars that is also higher than those obtained in the prior process.

the control of the hydrolysed extract is carried out by recirculation outlets, to which concentration are connected hydrolysis extract recirculation circuits, each formed by a suction duct of a recirculation pump that conducts a portion of the hydrolysis extract to a hydrossolvent feeding tube. This arrangement of hydrolysis extract recirculation allows providing a controlled agitation of the reactional medium, by using a device provided external to the reactor, of high mechanical efficiency, accessible for maintenance, and which dispenses heavy and complex devices that would be necessary in case internal agitators are used.

In accordance with the improvements introduced by the present invention, there is provided the partial recirculation of the hydrolysis extract effluent from different levels of the reactor, as well as the injection of heating steam directly into said levels of the reactor, enabling an extremely precise adjustment of both the concentration and the temperature of the reagents fed in each level of the reactor, by simply adjusting the flow of the steam and of the recirculate which, without reagents, works as a diluent for a given feeding of a new reagent that is incorporated to the hydrossolvent.

BRIEF DESCRIPTION OF THE DRAWINGS

The invention will be described with reference to the enclosed drawings, given by way of example of a construction of the invention and in which.

DETAILED DESCRIPTION OF THE INVENTION

Figure 1:
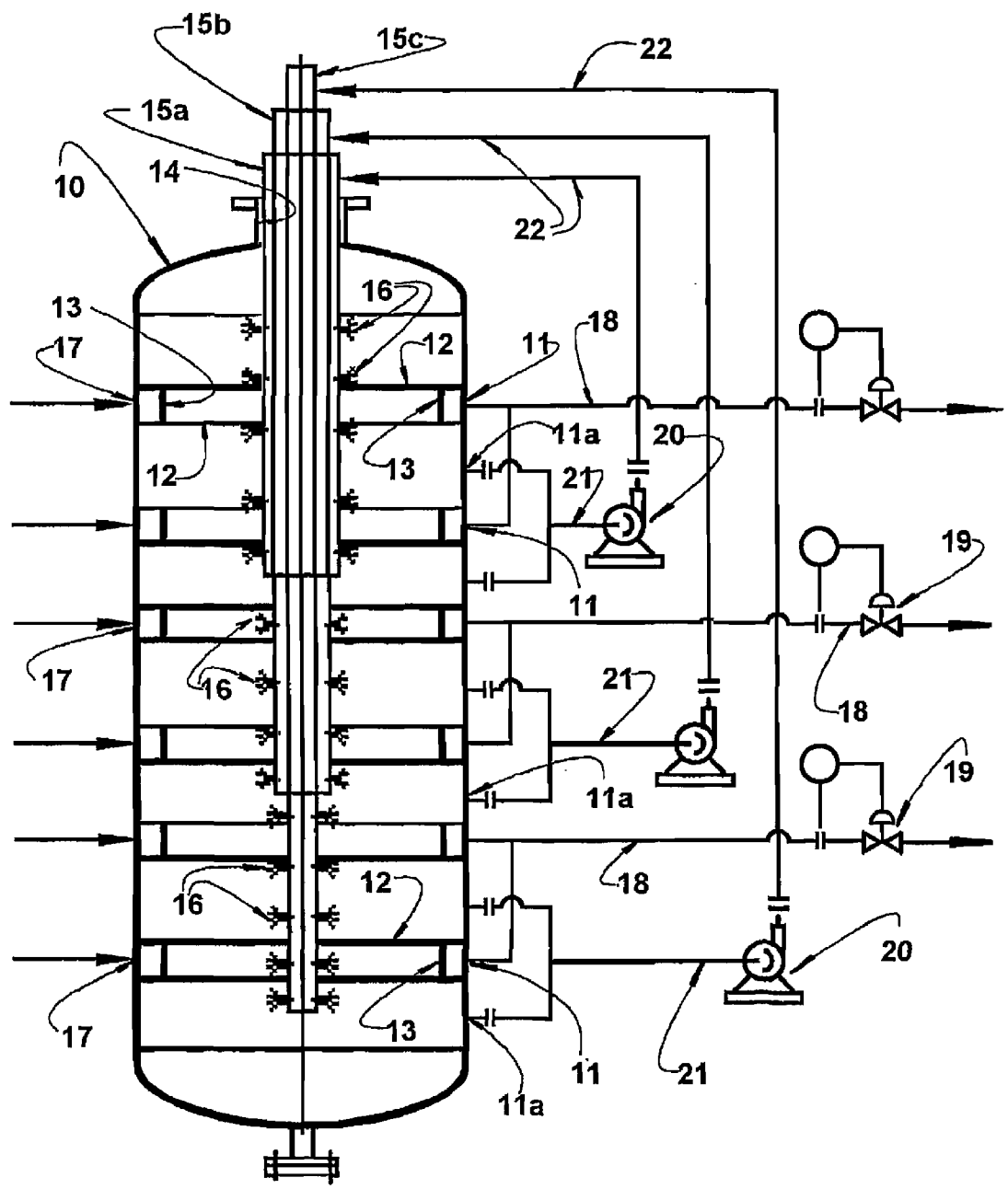
FIG. 1 represents a schematic vertical cross sectional view of a possible reactor construction developed for the execution of the process for acid hydrolysis object of the present invention.
Figure 2:
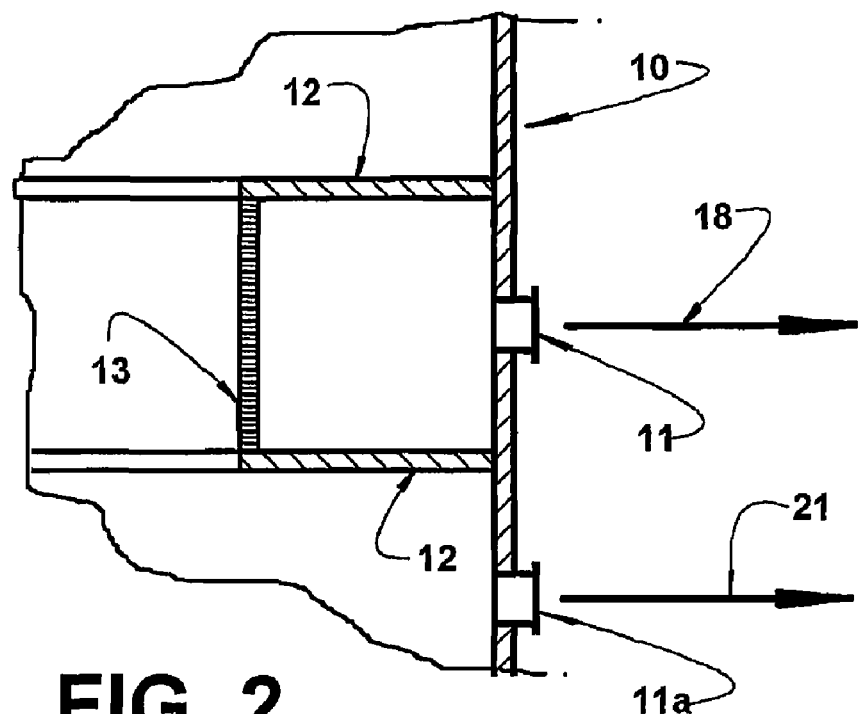
FIG. 2 represents an enlarged detail of part of the reactor, illustrating a hydrolysis extract captation.
Figure 3:
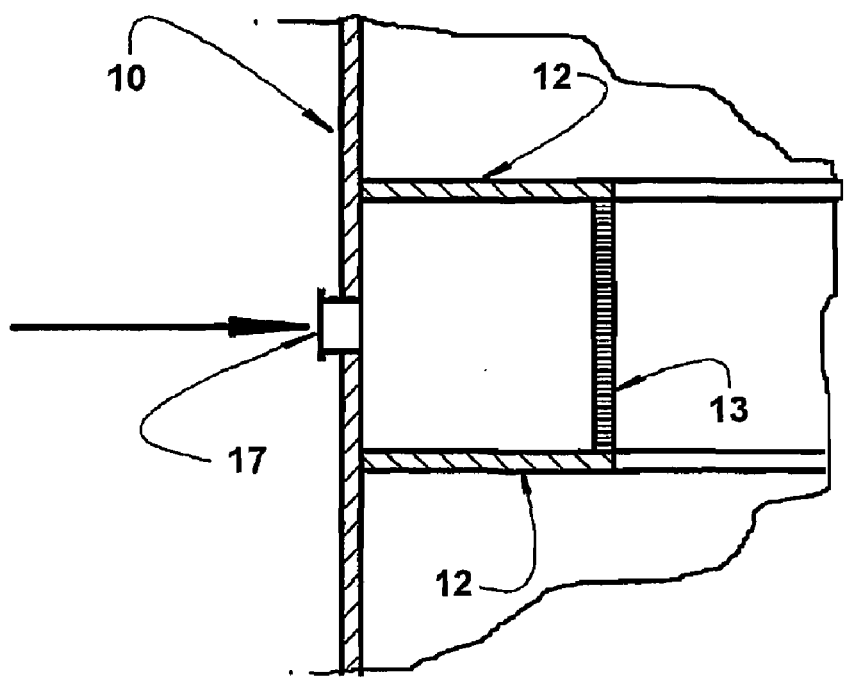
FIG. 3 represents an enlarged detail of part of the reactor, illustrating the heating steam inlet.
Figure 4:
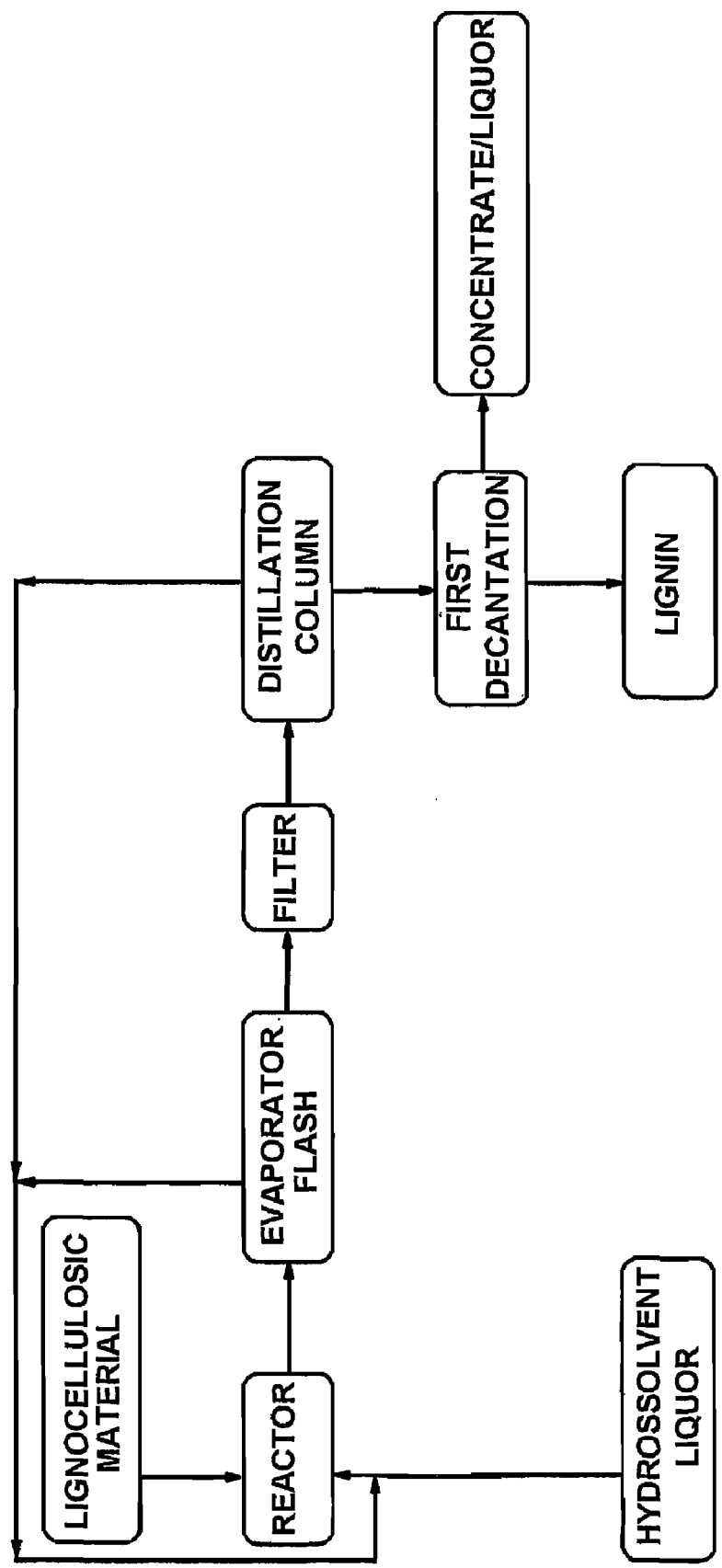
FIG. 4 represents a flowchart of the process of the present invention.

Although the cellulosic component of the lignocellulosic material to be treated comprises a hemicellulosic portion and a cellulosic portion itself, for the purpose of simplification of the disclosure to follow, the expression "cellulosic portion" will be used for making reference to both said portions, in its group.

Once the proposed process is a continuous one, both the lignocellulosic and the hydrossolvent feeding must be constant and uniform. As such, as well as to secure a satisfactory contact surface between said hydrossolvent and lignocellulosic material, and further to avoid obstructions of the material at the reactor inlet, said material is comminuted until it reaches the size of a hydrolizably acceptable particle.

Next, the lignocellulosic material feeding is pre-heated up to a temperature of 80 to 180° C., and preferably up to 100 to 150° C., so as to soften the vegetal fiber, expel air bubbles occluded therein, thereby facilitating the penetration of the hydrossolvent and, consequently, the dissolution of the lignin within the reactor 10, liberating the cellulosic portion for a rapid and efficient acid attack.

In order to function as described above, the hydrossolvent system comprises: from 40 to 90% in volume, and preferably from 50 to 80% in volume of a lignin solubilizing organic solvent selected from the group consisting of alcohols with 1 to 4 carbon atoms, cetones of 2 to 6 carbon atoms and mixtures thereof, preferably methanol, ethanol, acetone and the like, or mixtures of same, and more preferably ethanol; from 10 to 60% in volume, and preferably from 20 to 50% in volume of water; and a strong inorganic acid selected from the group consisting of sulfuric acid, chloric acid, phosphoric acid and the like, or mixtures thereof and preferably sulfuric acid in such a quantity as to provide a concentration of 0.01N to 0.1N, and preferably from 0.02N to 0.05N of said acid in said hydrossolvent system.

The delignification and saccharification step of the lignocellulosic material is processed in a distinct manner in each level within the reactor 10. Different concentrations of active acid should be provided between the raw material and hydrossolvent and different temperatures of reaction in each level of the reactor, the adjustment of such parameters being carried out through a step that is a fundamental characteristic of the proposed process, whichever is the recirculation of a part of the hydrolysis extract effluent from the reactor 10, therefore, without the reacting acid: since new hydrossolvent is introduced at constant temperature and concentration, the simple adjustment of the temperature of the recirculated extract and of the flows thereof and of the new hydrossolvent will adequate the acid concentration to that strictly necessary in order to react with the cellulosic portion of the lignocellulosic feeding of the reactor 10.

According to the improvements proposed herein, the recirculation of part of the hydrolysis extract effluent from each level of the reactor 10 is made in a respective independent recirculation circuit of an outlet tube 18 of hydrolysis extract that is responsible for conducting part of the hydrolysis extract to subsequent process steps for separating sugars and lignins.

Another feature of the improvements proposed herein concerns the heating used for controlling the temperature of the reagents in the different levels of the reactor 10. The temperature control of the improved process is carried out by a plurality of heating steam inlets 17 designed to present a predetermined defined flow, each heating steam inlet 17 being positioned in one of the cited levels of the reactor 10.

In general terms, the delignification and saccharification step is carried out within the reactor 10 at a temperature of 160 to 250° C., and preferably from 180 to 190° C., advantageously under pressure of 20 to 40 bar, and preferably from 20 to 30 bar. The hydrossolvent and lignocellulosic material feeding are evenly distributed, according to the hydrossolvent radial currents in a proportion of 2 to 18, and preferably from 3 to 10 $M^3$ of hydrossolvent by ton of the hydrocellulosic material to be treated. Under such conditions, both currents intimately contact one another, obtaining the aforementioned liquid and solid phases. In order to prevent that greater degradations of the formed sugars occur, said liquid phase, or extract, is immediately transferred to a rapid solvent evaporator ("flash evaporator"), suffering an abrupt decrease in temperature.

The extract obtained in the delignification and saccharification step, after being cooled down, and preferably filtered off, is transferred to a distillation column in which it is concentrated, by extracting a greater quantity of solvent, which is recycled to the process. The concentrated extract thus obtained is received in a first decanter, in which it separates in a lower layer comprising lignin and an upper layer defining a concentrate or liquor comprising sugars, with an assay of up to 35% by weight, depending on the starting lignocellulosic material, and the remaining products resulting from the saccharification reaction, and a lignin deposit, insolubilized by the withdrawal of the solvent.

The decanted lignin is recovered, at least partially dewatered or dried, and may be used in several applications, from fuel, in view of its calorific lower power (PCI) of 24.4 MJ/KG when it dries and to the low ash (0.30%) and sulfur (0.14%) assays, and even as raw material for the manufacture of phenolic resins (substituting the phenol), due to its high chemical reactivity.

The liquor is submitted to subsequent operations for the recovery of the remaining products.

In the steps prior to the concentration of the liquid phase, it is very important that the extraction operation of the solvent be adjusted so that a smaller portion of said solvent remains in the solution, to conduct the lignin to the distillation step, thus avoiding its incrustation in the equipment as it normally occurs in the majority of the known processes.

Although the present process may be carried out in conventional equipment, eventually submitted to slight modifications and presenting yield levels above those already known in the art, the best results have been achieved with the reactor 10 specially developed for the execution of the present process.

According to FIG. 1, the hydrolysis reactor 10 comprises a vertical cylindrical tubular body constituted of an adequate metallic material, such as stainless steel, internally incorporating, in the corresponding levels of said reactor 10, a plurality of preferably six hydrolysis extract captations 11, each being defined between two filter support rings 12, preferably constituted of the same material as that of said reactor 10 and incorporated, such as by welding, to the internal wall thereof, said rings 12 being substantially parallel and spacedly disposed. A cylindrical filtrating screen 13 constituted of an adequate material, such as stainless steel, is fixed, such as by screwing, to the internal edges of said rings 12, and further presenting mesh Tyler between 16 and 200, preferably mesh Tyler 100. An orifice, which is not illustrated, is provided on the wall of the reactor 10, radially disposed relatively to said filtrating screen 13, to define the captation of the hydrolysis extract fluid filtered from the interior of the reactor 10, between each two adjacent rings 12.

Preferably, the reactor 10 is fed by the top with lignocellulosic material through a feeding lignocellulosic material opening 14, and with hydrossolvent through a plurality of, and preferably, three hydrossolvent feeding tubes 15a, 15b, 15c, which are concentric and internal to said opening 14, of increasing length from the outside towards the inside, and closed in its free ends, each being provided with a plurality of lateral spraying orifices 16, so as to radially spray the hydrossolvent against the lignocellulosic material in different levels inside said reactor 10, providing an intimate contact between one another.

Externally to the reactor 10, each two regions of the latter, defined beneath respective and adjacent hydrolysis extract captations 11 and externally to the respective pair of filter support rings 12, are provided with recirculation captations 11a, to which are connected hydrolysis extract recirculation circuits, each formed by a suction duct 21 of a recirculation pump 20, whose discharge tube 22 conducts the respective portion of hydrolysis extract to a respective hydrossolvent feeding tube 15a, 15b, 15c. Such construction avoids the recirculated extract from being submitted to filtration, and it may contain particulate and still not hydrolyzed lignocellulosic material, and not being subject to flow limitations imposed by the cylindrical filtrating screens 13.

On the other hand, each two captations 11 are joined in an outlet tube 18 provided with a flow control means 19, such as a control valve.

The hydrolysis reactor 10 is further provided with a plurality of heating steam inlets 17 disposed in the different levels of the reactor 10 and discharging steam directly into the interior of the reactor (10), in the space defined between two adjacent rings 12 and between the screen 13 and the external wall of the referred reactor 10.

The hydrolysis reactor 10, as described above, operates flooded, the liquid medium flooding it at least until the upper captation 11 is covered, such level being constant, once being the hydrolysis process continuous, the total lignocellulosic material and hydrossolvent feeding that enter the reactor 10 is substantially identical to the volume of the product withdrawn through the outlet tube 18.

According to the construction disclosed above, the reactor 10 must be initially flooded, the hydrossolvent being fed thereto until the desired level is achieved. Subsequently, the process is initiated by feeding the lignocellulosic material and the hydrossolvent to the reactor 10, through the feeding opening 14 and through the feeding tubes 15a, 15b and 15c, respectively.

The steam directly injected into the interior of the reactor through the heating steam inlet 17 allows reducing the alcohol assays in the lower levels, where it is less necessary, since all the lignin (reason for using the alcohol) has already been dissolved and extracted from the fiber, and further increasing the water and acid assays to values more favorable to the cellulose hydrolysis, which component is concentrated in these levels.

As the lignocellulosic material goes down within the reactor 10, through the hydrossolvent wash, it receives jets therefrom through the spraying orifices 16, being consumed in its hydrolyzed cellulosic portion to form sugars, while the lignin is dissolved and the resulting liquid blend defines a hydrolysis extract which is taken to the outside of the reactor 10 through the several captations 11 and tubes 18, which receive, this way, a filtered hydrolysis extract flow, in other words, substantially exempt of solid material, once the latter, comprising the semi-attacked raw material, is retained by the filtrating screen 13, from which it detaches due to the agitation provoked by the hydrossolvent liquor current, returning to the reaction medium. The mineral matter constituent of the vegetable separates as the latter is dissolved, being deposited at the bottom of the reactor 10.

As mentioned above, the hydrolysis extract obtained in a specific level of the reactor 10 is taken to the outside of the latter, through the corresponding tube 18 and a part of the hydrolysis extract withdrawn in other reactor levels is recirculated through the corresponding suction duct 21, through the recirculation pump 20 and through the discharge tube 22, to be refed to the reactor 10 through a respective hydrossolvent feeding tube 15a, 15b, 15c. As such, the hydrolysis extract, without the reacting acid, dilutes the new hydrossolvent, adjusting its acid concentration to that strictly necessary to react with the cellulosic portion of the raw material feeding in that level of the reactor 10.

The non-circulated part of the hydrolysis extract is withdrawn through the corresponding outlet tube 18, in order to be subjected to an abrupt decrease of temperature and consequent concentration by evaporation of the solvent, the hydrolysis extract thus concentrated being led to the subsequent processing.

The construction proposed herein for the reactor 10 is preferred, since it conciliates low manufacture and installation costs with a high operational performance, for as the processing of the lignocellulosic raw material generally utilized and due to the specifications generally accepted for the end products.

However, due to the specific requirements on the raw material or the end product, the hydrolysis reactor may present several modifications, such as:
  a lower or greater number of hydrolysis extract captations;
  each hydrolysis extract captation may be provided with a plurality of reactor outlet orifices, the latter being connected to the fluid circuit by means of a corresponding collector;
  the upper filter support ring of each hydrolysis extract captation may present a bigger diameter, so that the corresponding filtrating screen be inclined downwardly, thereby facilitating the silica precipitation;
  each hydrolysis extract captation may be connected to an individual fluid circuit, hydrossolvent feeding tubes and individual reactor outlet tubes being thus provided; and
  each fluid circuit may be connected to three or more hydrolysis extract captations.

In order to allow sporadic withdrawal of the silica and other insoluble solids deposited at the bottom of the reactor 10, the latter is provided therein with a drain opening 3.

Although the hydrolysis reactor 10 for the process proposed herein may be made of, for example, stainless steel 316 L, since it uses extremely dilute sulfuric acid, if desired, the constructive material may be carbon steel coated with a protecting metal, such as niobium, titanium or zirconium.

The invention claimed is:

1. An improvement in a process for rapid acid hydrolysis of lignocellulosic material having a cellulosic portion and a lignin portion, comprising the steps of:
  (a) providing a pressurized reactor comprising a top, a bottom, an exit and multiple levels and continuously feeding from the top of the reactor to different levels of the reactor a uniform flow of pre-heated and comminuted lignocellulosic material;
  (b) contacting said lignocellulosic material in the different levels of the reactor with a plurality of flows of a hydrossolvent system hydrossolvent comprising a greater portion of a lignin solubilizing organic solvent and water and a smaller portion of an extremely dilute solution of a strong inorganic acid, so as to simultaneously dissolve the lignin portion and react with the cellulosic material portion, obtaining a liquid phase in the form of a hydrolysis extract comprising reaction products of the cellulosic portion and a lignin solution, and a solid phase comprising non-reacted and non-dissolved material;

(c) retaining said solid phase in such a way as to provide its deposition at the bottom of the reactor;

(d) injecting a controlled steam flow in the different levels of the reactor containing lignocellulosic material, adjusting the temperature to the a desired value, and incorporating the condensate resulting from the steam to the hidrossolvent flow a corresponding hydrosolvent flow, so as to provide, in said different levels of the reactor containing lignocellulosic material, temperatures of the organic solvent and of the strong inorganic acid solution that are adequate to dissolve the lignin portion and to cause the cellulosic material portion present in the respective levels of the reactor to react with the water (hydrolysis) forming the and form desired products (sugars);

(e) recirculating a controlled flow of the liquid phase hydrolysis extract comprising reaction products of the cellulosic portion and a lignin solution obtained in step (b) (c) in the different levels of the reactor containing lignocellulosic material, and incorporating said hydrossolvent controlled flow with a corresponding hydrosolvent flow so as to provide, in said different levels of the reactor containing lignocellulosic material, concentrations of organic solvent and strong inorganic acid solution that are adequate to react with the cellulosic material portion and to dissolve the lignin portion present in the respective levels of the reactor;

(f) withdrawing, directly from said different levels of the reactor containing lignocellulosic material, the remainder of said liquid phase hydrolysis extract comprising reaction products of the cellulosic portion and a lignin solution submitting it, at the exit of said reactor, to an abrupt lowering of temperature in such a way as to avoid decomposition reactions of said reaction products of the cellulosic portion and obtaining, by evaporation of the solvent hydrosolvent a concentrate of the reaction product products of the cellulosic portion and of the lignin solution;

(g) transferring said concentrate of the lignin solution by decantation; and (h) transferring said concentrate of the reaction products of the cellulosic portion to the subsequent processing steps.

2. The improvement, as set forth in claim 1, wherein the hydrosolvent incorporated to the recirculation flow of the liquid phase is contacted with the lignocellulosic material in accordance with radial flows.

3. The improvement, as set forth in claim 1, wherein the hydrosolvent comprises: from 40 to 90% in volume of an organic solvent selected from the group consisting of alcohols with 1 to 4 carbon atoms, ketones from 2 to 6 carbon atoms, or mixtures thereof; from 10 to 60% in volume of water; and a strong acid selected from the group consisting of sulfuric acid, chloric acid, phosphoric acid, or mixtures thereof, in such a quantity as to provide a concentration from 0.01N to 0.1N of said acid in said hydrosolvent.

4. The improvement, as set forth in claim 1, wherein the hydrosolvent comprises: from 50 to 80% in volume of an organic solvent selected from the group consisting of methanol, ethanol, acetone, or mixtures thereof; from 20 to 50% in volume of water; and sulfuric acid in such a quantity as to provide a concentration from 0.01N to 0.05N of said acid in said hydrosolvent.

5. The improvement, as set forth of claim 1, wherein the organic solvent comprises ethanol.

6. The improvement, as set forth in claim 1, wherein the pressure of the reactor is from 20 to 40 bar.

7. The improvement, as set forth in claim 1, wherein the lignocellulosic material feeding occurs at a temperature of 80° to 180° C.

8. The improvement, as set forth in claim 1, wherein the temperatures in the multiple levels of the reactor are from 160° to 250° C.

9. An improvement introduced in a hydrolysis reactor for executing the delignification and saccharification in the process of hydrolysis defined in claim 1 and the reactor comprising:
a vertical tubular body provided with a plurality of hydrolysis extract captations, the vertical tubular body having a plurality of levels and each hydrolysis extract captation being at a different level;
an upper lignocellulosic material feeding opening;
a plurality of hydrosolvent feeding tubes, each feeding tube feeding a different level of the vertical tubular body;
a plurality of hydrolysis extract recirculation circuits, each connecting at least one hydrolysis extract captation to a respective hydrosolvent feeding tube;
a hydrolysis extract outlet tube, connected to at least one hydrolysis extract captation; and
a plurality of heating steam inlets, each steam inlet being located at a different level of the vertical tubular body and designed to produce a predetermined defined flow.

10. The improvement, as set forth in claim 9, wherein each hydrolysis extract captation is defined between two filter support rings substantially horizontal and which are parallel and sacredly fixed to an internal wall of the reactor and carrying a cylindrical filtrating screen, each captation being defined by an orifice radially provided on the internal wall of said reactor.

11. The improvement, as set forth in claim 10, wherein the heating steam inlets are provided between each two adjacent filter support rings, in each of the different levels of the reactor.

12. The improvement, as set forth in claim 9, wherein each hydrolysis extract recirculation circuit comprises a suction duct connecting a respective hydrolysis extract captation to a recirculation pump and a discharge tube connecting a recirculation pump to a respective hydrossolvent feeding tube.

13. The improvement, as set forth in claim 12, wherein the hydrolysis extract recirculation captations are positioned beneath respective and adjacent hydrolysis extract captations and externally to the respective pair of filter support rings.

\* \* \* \* \*